(12) United States Patent
Niiyama et al.

(10) Patent No.: US 7,382,422 B2
(45) Date of Patent: Jun. 3, 2008

(54) LCD WITH RESIN LAYER BETWEEN FRONT PLATE AND SUBSTRATE

(75) Inventors: Satoshi Niiyama, Kanagawa (JP); Hitoshi Tsushima, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 130 days.

(21) Appl. No.: 10/921,842

(22) Filed: Aug. 20, 2004

(65) Prior Publication Data

US 2005/0083465 A1    Apr. 21, 2005

(30) Foreign Application Priority Data

| Aug. 22, 2003 | (JP) | ............................ 2003-299197 |
| Dec. 17, 2003 | (JP) | ............................ 2003-420063 |
| Dec. 17, 2003 | (JP) | ............................ 2003-420065 |
| Jul. 22, 2004 | (JP) | ............................ 2004-214986 |

(51) Int. Cl.
*G02F 1/1333* (2006.01)

(52) U.S. Cl. ...................................... 349/58
(58) Field of Classification Search .................. 349/58
See application file for complete search history.

(56) References Cited

U.S. PATENT DOCUMENTS 5,455,313 A * 10/1995 Kurusu et al. .............. 525/478
5,691,794 A    11/1997 Hoshi et al.
5,969,023 A *  10/1999 Enami et al. ................ 524/252
6,317,189 B1 * 11/2001 Yuan et al. .................. 349/176
7,057,681 B2 *  6/2006 Hinata et al. ................ 349/96
2002/0154254 A1 * 10/2002 Tasaki et al. ................. 349/58
2005/0083465 A1   4/2005 Niiyama et al.

FOREIGN PATENT DOCUMENTS

JP       6-337411       12/1994
JP      11-249120        9/1999

OTHER PUBLICATIONS

U.S. Appl. No. 11/441,127, filed May 26, 2006, Sato et al.

* cited by examiner

*Primary Examiner*—David Nelms
*Assistant Examiner*—Phu Vu
(74) *Attorney, Agent, or Firm*—Oblon, Spivak, McClelland, Maier & Neustadt, P.C.

(57) ABSTRACT

An aspect of a public display device includes a transparent front plate 210, a rear frame 220 and a display panel 230. The rear frame 220 is configured to have a waterproof structure, and the transparent front plate and the rear frame are sealed with a silicone resin interposed therebetween so as to have a waterproof property. A transparent gel-like resin layer 250 is formed between a rear side of the transparent front plate and a front side of the display panel. The transparent gel-like resin layer reduces a stress, which is applied to the display panel by deformation of the transparent front plate. Thus, it is possible to prevent a display state from being changed by an external force when a memory type liquid crystal display device is used.

22 Claims, 11 Drawing Sheets

LCD WITH RESIN LAYER BETWEEN FRONT PLATE AND SUBSTRATE

The present invention relates to a display device and a method for fabricating the same.

Flat displays, such as a liquid crystal display device and an organic EL (Electroluminescence) display device, have been remarkably widely used as information technology and communication technology have developed. Such display devices are applied to not only information and communication equipment but also various kinds of products, and the application range of such devices has increasingly widened. For example, conventional shelf labels, advertisements and timetables are displayed on printed matter, such as a paper sheet or a resin plate. When the contents of display is changed, the printed matter has been exchanged directly by a man or woman. In other words, a change in the contents of the display needs some resources, some time, some work and some costs.

From this viewpoint, technique wherein a display device, which is capable of electrically changing the contents of display, is used to display a shelf label, an advertisement, a timetable or the like, has been proposed (see, e.g., JP-A-2001-184033). By this technique, it is possible to quickly and easily change the contents of display. The display device proposed in this publication includes a memory type display panel having no need of electric power in order to maintain an image, a photogenerator for converting light energy into electric energy, a battery for storing the power generated by photogenerator, and a controller for supplying power to the memory type display panel from the battery to change a display on the display panel.

It has been disclosed that the memory type display device is configured by using a cholesteric liquid crystal or a chiral nematic liquid crystal (hereinbelow, referred to as the chiral nematic liquid crystal). A chiral nematic liquid crystal can perform a state change from a planar state into a focal conic state or, conversely, from the focal conic state to the planar state. The chiral nematic liquid crystal can maintain either one of the states without supply of external energy (i.e., power). The chiral nematic liquid crystal is adjusted so that the wavelength of a corresponding color is selectively reflected in the planar state, and that visual light is slightly scattered in the focal conic state. By this arrangement, the chiral nematic liquid crystal can maintain a displayed image without power consumption.

By using a memory type display device, it is possible to minimize power consumption. The photogenerator is used to generate electricity, the electricity generated by the photogenerator is accumulated in the battery, and the accumulated electricity is used to switch displayed images on the display device as need arises. When the display device is additionally provided with an information receiver for receiving information from outside, a displayed image can be renewed in accordance with a command from outside, and display information can be transmitted to the display device from outside.

One of the application forms of such a type of display device is a price tag for commodities dealt with by a department store or the like. Commodity data (such as, a commodity price and explanation of the commodity) are wirelessly transmitted from a communication terminal (such as a host computer) to the liquid crystal display device. The liquid crystal display device uses a receiver to receive the commodity data transmitted from the communication terminal and displays (or rewrites) an image on the liquid crystal panel based on the received data. At that time, the power necessary for displaying or rewriting the commodity data may be supplied from the battery, which has accumulated electricity generated by a solar cell.

Additionally, it has been proposed to apply this type of display device to provision of information on departure and arrival for transportation, such as a train, a bus or an airplane, provision of information necessary for passengers, such as a delay in train departure due to an accident, provision of necessary information inside the transportation, provision of a place where an employee is (such as a place where he or she has gone, and a meeting room where he or she is) or the like. Technique wherein a receiver is mounted on a last bus or a last train to turn on or off the running light of a stop for indicating the end of service has been disclosed in JP-A-48-069499.

When a display device is used for public display in a shop, a hotel, transportation or the like, it is important to provide a housing structure for housing the display panel. The housing for housing a display panel needs to include a structure capable of effectively protecting the display panel since the public display device is used for the general public or since the public display device is installed under an environmentally severe condition in many cases.

In particular, when a multistable memory type display panel, which is made of a chiral nematic liquid crystal or the like, is used, the display device has a property wherein a display state is changed by application of a stress to the display panel, and the display state after change is maintained. From this viewpoint, it is important to reduce the stress to the display panel and to prevent the display state from being changed. For example, when a memory type display panel is applied to a public display device, it is necessary to provide a structure to reduce a stress to a display panel surface applied by an external force and to effectively prevent a display state from being changed.

On the other hand, an external force, which is applied to a display panel, can cause a big problem in fabrication of the display device. For example, there is a possibility that a great external force, which is applied to the display panel in a fabrication process, deforms the display panel to make the display panel out of order. Or, when a display panel is deformed by an external force applied to the display panel in the fabrication process, and when the deformation remains in the display panel, there is a possibility that the remaining deformation causes display failure, such as chrominance non-uniformity in display after the display panel has been finally incorporated in a display device.

From this viewpoint, it is an object of the present invention to effectively protect a display panel in the display device.

In a first aspect of the present invention, there is provided a display device comprising a display panel having an active area to display an image; a transparent front plate disposed in front of the display panel; and a transparent resin layer in a gel state, the resin layer formed between the front plate and the active area. According to this aspect, it is possible to effectively protect the display panel.

It is preferable that the transparent resin layer be formed so as to cover a substantially entire region of the active area. According to this aspect, it is possible to more effectively protect the display panel.

It is preferable that the transparent resin layer have a ¼ consistency of from 5 to 500. According to this mode, it is possible to provide an effective support for maintaining of the display panel and to effectively restrain a stress applied to the display panel. Or, it is preferable that the transparent resin layer be made of a silicone resin. Or, it is preferable that the transparent resin layer be formed by curing a two-component liquid resin material injected into between the display panel and the front plate. According to this mode, it is possible to effectively form the transparent resin layer, which effectively restrains the stress applied to the display panel.

It is preferable that the liquid resin material have a viscosity of 100 to 2,000 mPaS (at 25° C.). According to this mode, it is possible to effectively inject an uncured liquid resin material and to effectively form the transparent resin layer, which effectively restrains the stress applied to the display panel.

It is preferable that the liquid resin material include a cure retarder. According to this mode, it is possible to effectively restrain the viscosity of the liquid resin from being increased since the curing of the resin has progressed than needed, e.g., in a case wherein the display panel is large and the injection time is long.

In another aspect of the present invention, there is provided a display device comprising a display panel having an active area to display an image; a transparent front plate disposed in front of the display panel; and a transparent elastic resin layer formed between the front plate and the active area so as to restrain a stress from being applied from the front plate to the display panel. It is preferable that the transparent elastic resin layer have a tensile elasticity of 100 MPa or below at 25° C. According to this mode, it is possible to more effectively protect the display panel.

It is preferable that the active area and the front plate have a layered structure formed therebetween without interposition of an air layer. According to this mode, it is possible to effectively restrain light from being reflected on an interface between adjacent layered substrates.

It is preferable that the display panel display images in a plurality of memory type display states. According to this mode, it is possible to reduce power consumption and to install the display device at various places. Additionally, it is possible to effectively prevent a memory type display state from being changed by an external force.

It is preferable that the front plate comprise an inflexible glass plate. Or, It is preferable that the front plate has a curved shape. By either one of the arrangements, it is possible to effectively restrain an external force applied to the front panel from being transmitted to the display panel. It is preferable that the display panel comprise a liquid display panel, and the transparent resin layer contains an ultraviolet absorbent. According to this mode, it is possible to restrain the liquid material from being degraded even when ultraviolet light is contained in external light, which is necessary for a viewer to see an image.

In another aspect of the present invention, there is provided a method for fabricating a display device, which comprises a display panel having an active area to display an image; and a transparent front plate disposed in front of the display panel; comprising fixing the display panel to the front plate by a fixing member; injecting a liquid resin material into a space in a depressurized state, the space formed between the display panel and the front plate; and curing the liquid resin material to form a transparent resin layer or a transparent resin layer in a gel state between the display panel and the front plant. By this mode, it is possible to restrain an external force from being applied to the display panel in a fabrication process.

It is preferable that the method further comprise injecting the liquid resin material under a degree of depressurization of from $1.33 \times 10^4$ to $6.67 \times 10^4$ Pa, in the step for injecting the liquid resin material. By this mode, it is possible to effectively eliminate bubbles in the liquid resin material. Or, it is preferable that the method further comprise injecting the liquid resin material with the display panel and the front panel being inclined, in the step for injecting the liquid resin material. In this manner, it is possible to more effectively eliminate bubbles in the liquid resin material. It is preferable that the method further comprise modifying an inclination angle of the display panel and the front plate with respect to a horizontal direction according to an injection amount of the liquid resin material, in the step for injecting the liquid resin material. In this manner, it is possible to further effectively eliminate bubbles in the liquid resin material.

It is preferable that the method comprise fixing the display panel and the front plate by plural fixing members, which are disposed at intervals to form spacings; and injecting the liquid resin material into the space formed between the display panel and the front plate while discharging a portion of the liquid resin material, through the spacings, from the space formed between the display panel and the front plate, in the step for injecting the liquid resin material. In this manner, it is possible to restrain a stress from being applied to the display panel. It is preferable that the method further comprise fixing a frame to the front plate before injecting the liquid resin material, the frame being configured to surround the display panel and prevent the liquid resin material from discharging. In this manner, it is possible to prevent the liquid resin material from discharging. Or, it is possible that the method further comprise further comprising fixing the frame to the front plate before injecting the liquid resin material, the frame being configured to surround the display panel and to have provided with an evacuation port, and; evacuating a gas through the evacuation port to depressurize an inner space of the frame in the step for injecting the liquid resin material. Or, it is preferable that the liquid resin material comprise a two-component curable resin containing no solvent. In this manner, it is possible to effectively form the transparent resin layer.

In another aspect of the present invention, there is provided a display device comprising a display panel having an active area to display an image; a transparent front plate disposed in front of the display panel; a transparent resin layer formed between the front plate and the active area so as to restrain a stress from being applied to the display panel; and plural fixing members, which are disposed between the display panel and the front plate to fix the display panel to the front panel; wherein the plural fixing members are disposed at intervals to form spacings, which are filled with the transparent elastic resin layer. According to this aspect, it is possible to restrain a stress from being applied to the display panel. It is preferable that the transparent elastic resin layer comprise a resin material in a gel state. In this manner, it is possible to more effectively restrain a stress from being applied to the display panel.

In accordance with the present invention, it is possible to reduce an external force applied to the display panel in the display device and to decrease the occurrence of failure in the display panel.

Now, embodiments, to which the present invention is applicable, will be described. The following description will be made to describe embodiments of the present invention. The present invention is not limited to the embodiment stated below.

Figure 1:
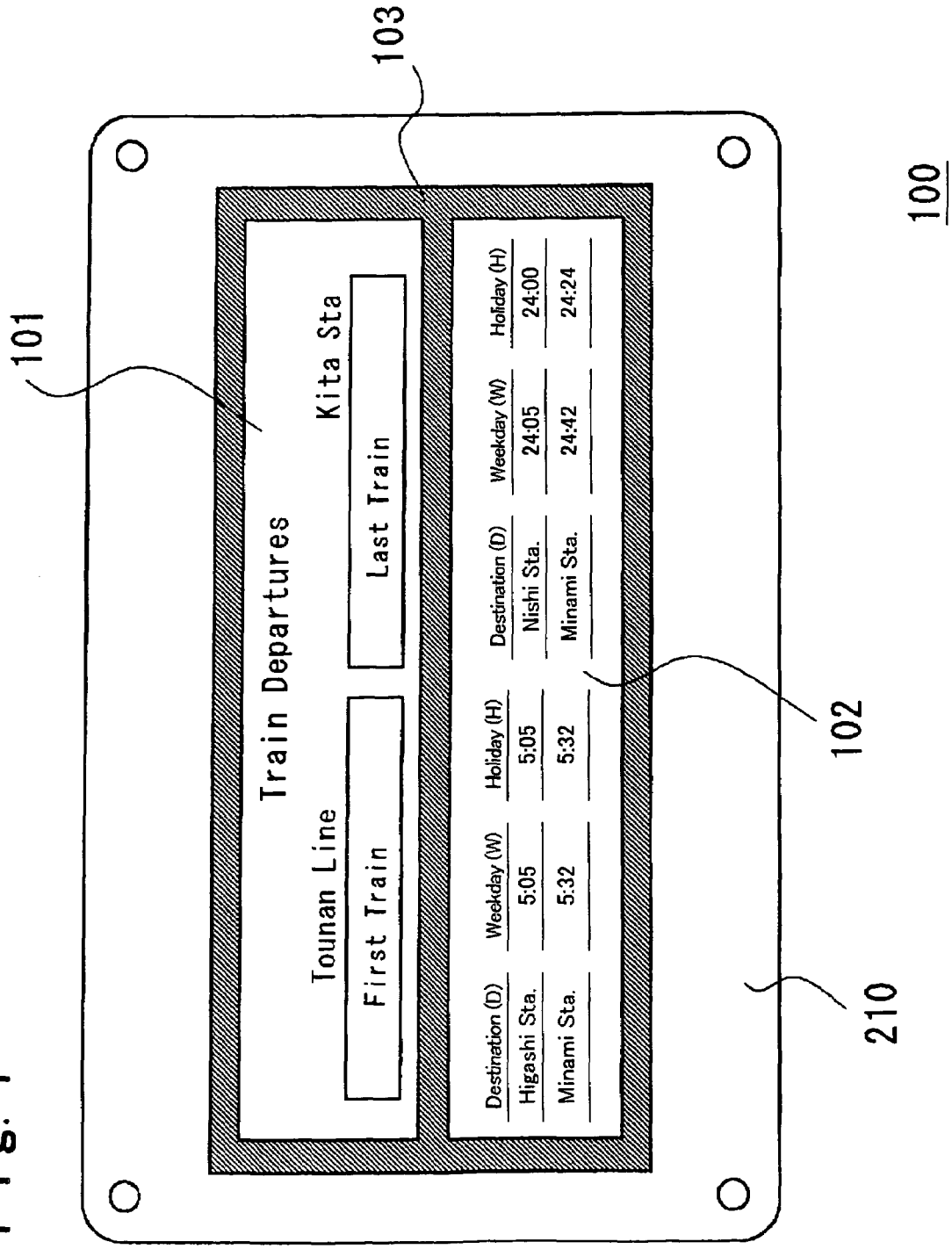
FIG. 1 is a schematic plan view of a display state in the display device according to an embodiment of the present invention.

FIG. 1 is a plan view showing a display screen of the display device 100 according to an embodiment of the present invention. The display device 100 includes display panels, which can electrically change display contents, and which are disposed on a rear side of a transparent glass front plate 210. The display device 100 may include a single or a plurality of display areas for displaying an image. In an example shown in FIG. 1, the display device 100 includes two active areas of an upper active area 101 and a lower active area 102, each of which is formed in a substantially rectangular shape.

Each of the active areas is surrounded by a black peripheral portion 103. The respective active areas can independently display various kinds of images containing identical or different characters, figures or symbols. The display device 100 may include three or more active areas. It is preferable that the black peripheral portion be disposed by baking ink paste containing colored ceramic particles, which is formed by screen printing. By using the black peripheral portion thus formed, it is possible to prevent the black peripheral portion from being deteriorated because of outdoor use. The black peripheral portion may have a graduated pattern formed therein, which may be provided by, e.g., printing a boundary area of a portion of the black peripheral portion in a dotted pattern. The black peripheral portion may be painted in a color different from black, such as white or gray, which is similar to the color displayed in the active areas.

In the example shown in FIG. 1, the display device 100 displays a timetable for first and last trains. The display device 100 may be disposed on a wall surface at a stairhead of a subway station to provide passengers with information on, e.g., the departure times of the first and last trains relative to a line and a destination. The display device 100 can cope with a change in the departure times of the first and last trains more effectively in comparison with a timetable printed on a plastic board since the display device can change the display contents easily.

Although a liquid crystal display panel, an organic EL display panel, an electronic-ink display panel or the like is applicable to the display device 100, it is particularly preferable to use a display panel with a display mode having a memory effect. In the display mode having a memory effect, the display panel can maintain a displayed image in such a state that the driving voltage is substantially 0 v or that the display panel is driven in a discontinuous manner. By this arrangement, it is possible to provide a display device capable of being disposed at any location since power consumption can be reduced and since an image can be displayed by using a primary cell or a secondary cell. As the power source, a solar cell may be used along with a primary cell or a secondary cell. A planar solar cell, which is translucent or is partially transparent, may be disposed at a location on the rear side of the transparent front plate, except for a rear frame.

For example, a chiral nematic liquid crystal display panel, a ferroelectric liquid crystal display panel, an antiferroelectric liquid crystal display panel, or an electronic-ink display panel is applicable as the display panel with a display mode having a memory effect. Among these display panels, the chiral nematic liquid crystal display panel is preferable in terms of display properties and power consumption. In particular, the chiral nematic liquid crystal display panel is appropriate to a big size of display device as in the case of being used for displaying a timetable. Explanation of the chiral nematic liquid crystal display panel will be made later.

The application of the display device 100 according to this embodiment is not limited to a timetable for first and last trains. The display device may be used for various kinds of applications, for example, to display a timetable for an airport, a bus stop or other transportation, to display information on a traffic accident or weather information, to be used as an electronic billboard capable of being used for advertisement, to display guide information or the contents of an event in a building or a hotel, or to be used as an electronic shelf label for indicating a price at a shop. A combination of such display modes may be displayed on a single display device.

Figure 2A:
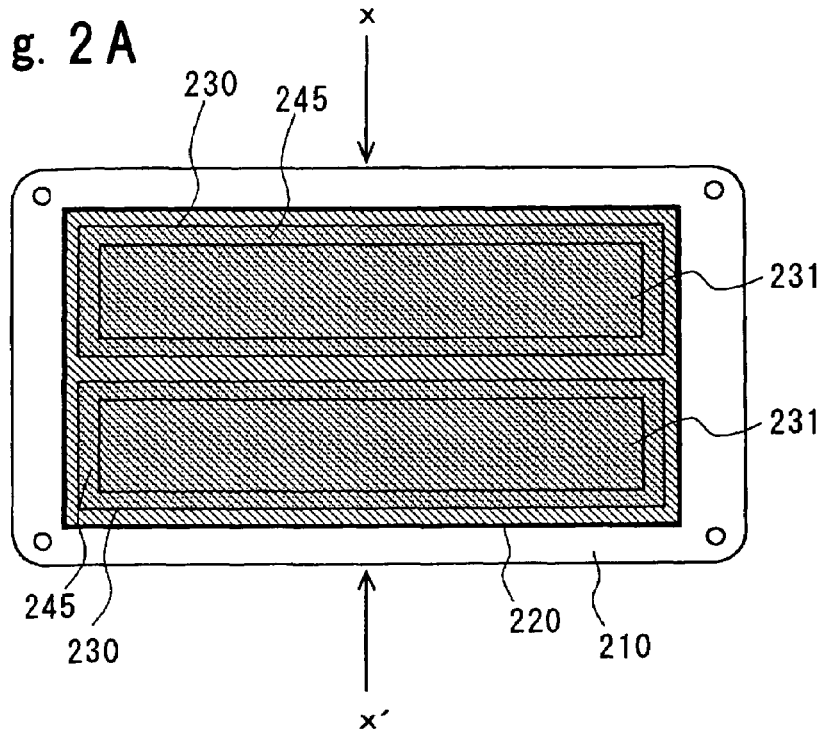
FIGS. 2A to 2C are schematic structural views of an example of the display device according to an embodiment of the present invention.
Figure 2B:
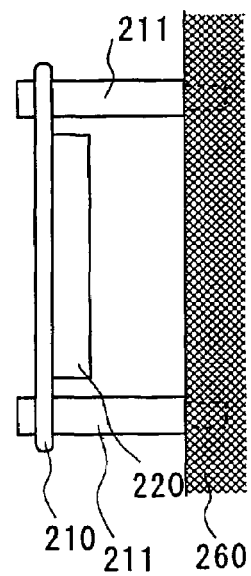
Figure 2C:
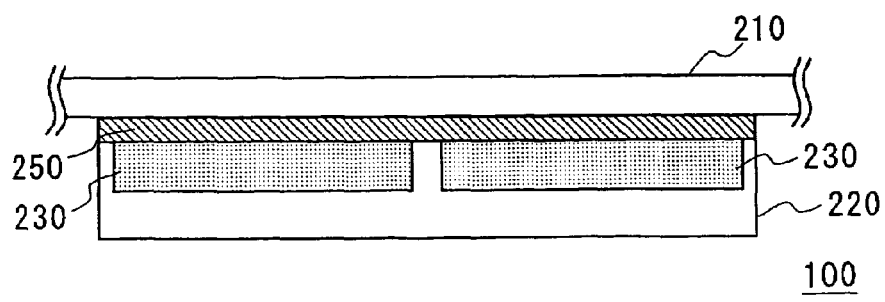

FIGS. 2A to 2C are schematic structural views of the display device 100. FIG. 2A is a front view of the display device 100. FIG. 2B is a side view of the display device 100, showing how the display device 100 is disposed on a wall surface 260. FIG. 2C shows a cross-sectional structure at a cross-section taken along the line x-x' of FIG. 2A. Please note that the respective views shown in FIGS. 2A to 2C are not depicted in the same dimensions. In FIGS. 2A to 2C, reference numeral 210 designates the transparent front plate, and reference numeral 220 designates the rear frame, which is fixed to the rear side of the transparent front plate. The rear frame 220 has a waterproof structure, wherein the transparent front plate 210 and the rear frame 220 have a silicone resin sandwiched therebetween to be sealed together, providing a waterproof property. The rear frame 220 may be configured to have an upper side provided with a solar cell. A waterproof control switch may be disposed on a lateral side of the rear frame 220. In this case, it is preferable in terms of security to use a control switch with a key.

Reference numeral 230 designates a display panel, which comprises a chiral nematic liquid crystal display panel in a preferred mode. The display device 100 includes two display panels 230, which correspond to the upper active area 101 and the lower active area 102, respectively. The display panels 230 are housed in the rear frame 220. By housing the display panels 230 in the waterproof rear frame 220, the display device can be installed at various kinds of places including an outdoor field. The rear side of the transparent front plate 210 and front sides of the display panels 230 have a transparent resin layer 250 formed therebetween to reduce a stress applied to the display panels 230. The transparent resin layer 250 is also formed in a gap other than the gap between the rear side of the transparent front plate 210 and the front sides of the display panels 230 so that the transparent resin layer covers the entire surface of the transparent front plate 210 in the rear frame 220. Detailed explanation of the transparent front plate 210 will be made later. The transparent front plate 210 and the transparent resin layer 250 may be colorless and transparent or be colored and transparent.

Each of the display panels 230 includes the active area 231 to display an image. Each of the display panels 230 also includes an outer peripheral area 245 outside the active area 231. A single display panel may include a plurality of active areas. Each of the display panels 230 includes a display cell for displaying an image, and various kinds of circuits, such as a driving circuit for displaying an image on the display cell, and a control circuit. The circuits may be mounted on the display cell or on a circuit board that is different from the display cell.

The transparent front plate 210 is a flat member, which has a substantially rectangular shape, and which has jigs 211 fixed to respective corners thereof to mount the display device 100 to a wall surface and so on. Each of the jigs 211 has one end fixed to the transparent front plate 210 and the other end fixed to the installation surface. Thus, the display device 100 can be easily and stably installed at viewers' desired place. It is possible to increase installation stability furthermore by adjusting the length of the jigs 211 to bring the rear frame 220 in contact with the wall surface 260 and by sealing the periphery of the contacted portions with, e.g., a silicone seal. For clarification of explanation, the black peripheral portion, which is shown in FIG. 1, is not shown in FIGS. 2A to 2C. The black peripheral portion may be formed on the surface of the transparent front plate 210 on the rear side.

Since the transparent front plate 210 functions as a protection plate for the display panels 230, the transparent front plate preferably comprises an inflexible transparent plate. The transparent front plate 210 may be made of glass or a transparent resin, such as polycarbonate. The appropriate material for the transparent front plate 210 may be selected, depending on the installation place or the application purpose of the display device 100. From the viewpoint of a reduction in weight, it is preferable to use a resin as the material for the transparent front plate. When the display device is installed in a public place, such as a station yard, it is preferable to use a glass plate, which is difficult to have a surface scratched or has superior strength. In this case, it is preferable to chamfer the glass plate at cut faces.

The display device 100 is configured to be visually recognized by viewers from a spatially distant position and is not supposed to have a display screen directly contacted by viewers. However, the transparent front plate is preferably made of tempered glass for a vehicle on the assumption that an abnormal external mechanical force is applied to the display device under an ordinary operating environment. Ordinary tempered glass, which is produced by an air-cooling and tempering method or a chemical tempering method, is applicable. By using a laminated glass structure wherein a resin layer is between the two glass plates, it is possible to prevent the front plate from being broken on fracture. The laminated glass is difficult to be removed from fixing jigs since the provision of the resin, which is sandwiched between the two glass plates, prevents the front plate from being broken. The laminated glass is preferable in terms of theft prevention.

When the transparent front plate 210 has a front side formed with an antireflection film, it is possible to further improve visibility of an image. The antireflection film may be formed by directly forming a thin film of silicate or a metal oxide on the glass surface at a film thickness by a sputtering method or a vapor deposition method, or by laminating a thin resin film having a low refractive index, such as fluororesin, on the glass surface through an adhesive layer. In particular, the antireflection film preferably has an outermost layer made of fluororesin since the antireflection film is provided with an antifouling performance or an easy-to-clean property.

Figure 4A:
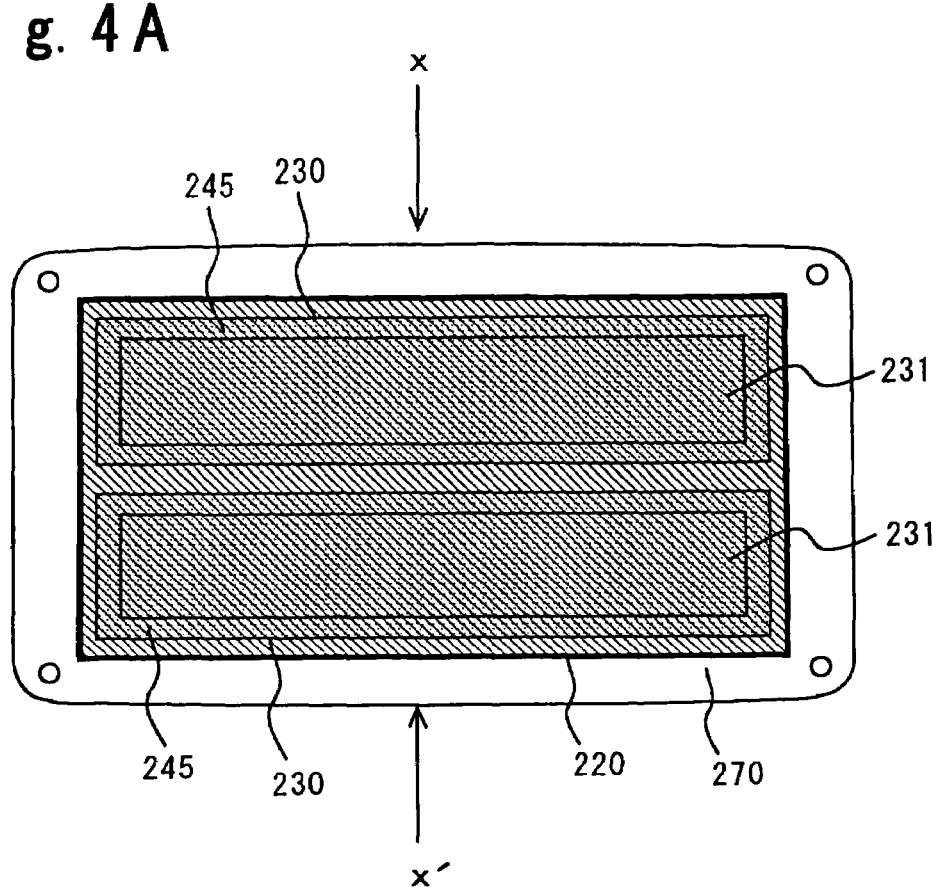
FIGS. 4A and 4B are schematic structural views of another example of the display device according to the embodiment.
Figure 4B:
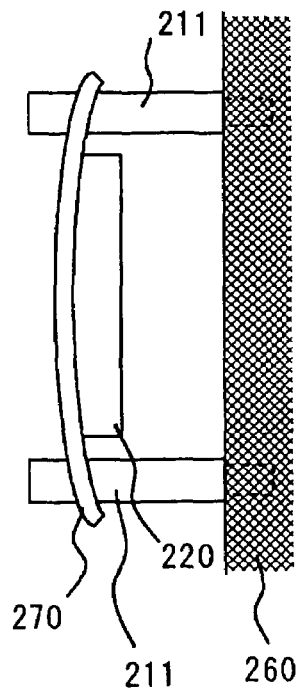

For example, the front plate (in a planar form) shown in FIGS. 2A to 2C may have dimensions of 564 mm in width×256 mm in length, and the active area of each of the two display panels in a substantially central portion of the front plate has dimensions of about 423 mm×about 63 mm. The rear frame, which is disposed on the rear side of the front plate, forms a housing, which has a thickness of about 30 mm. A front plate (in a curved form), which is shown in FIGS. 4A and 4B, has dimensions of 564 mm in width×398 mm in length when seen on a projected plane in a front direction. The front plate has about 20 mm in a depth of curvature from the rear side thereof to a straight line connecting both ends thereof.

Figure 3A:
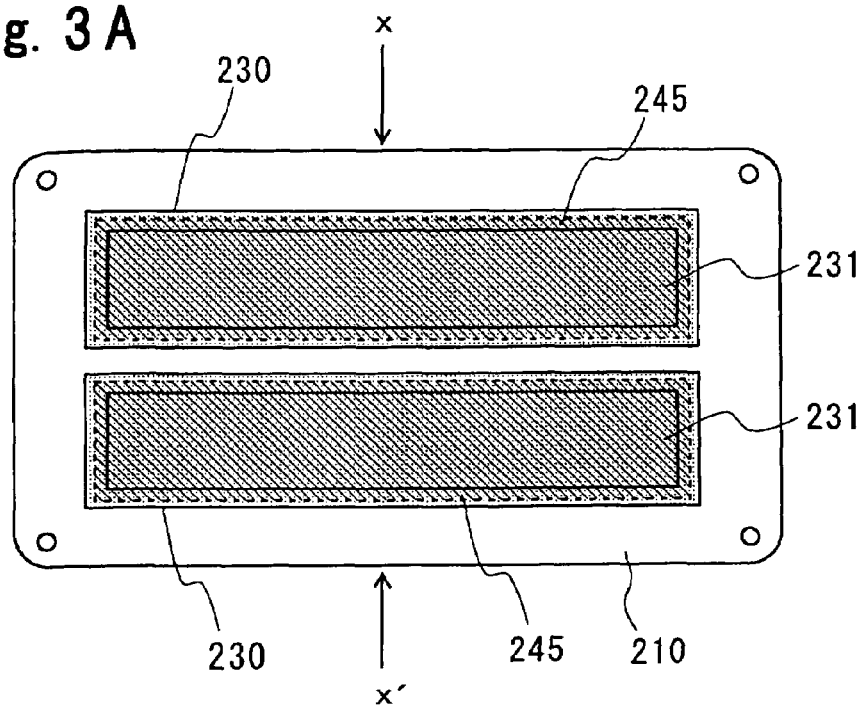
FIGS. 3A to 3C are schematic structural views of another example of the display device according to the embodiment.
Figure 3B:
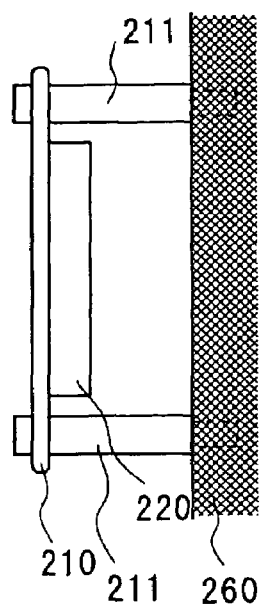
Figure 3C:
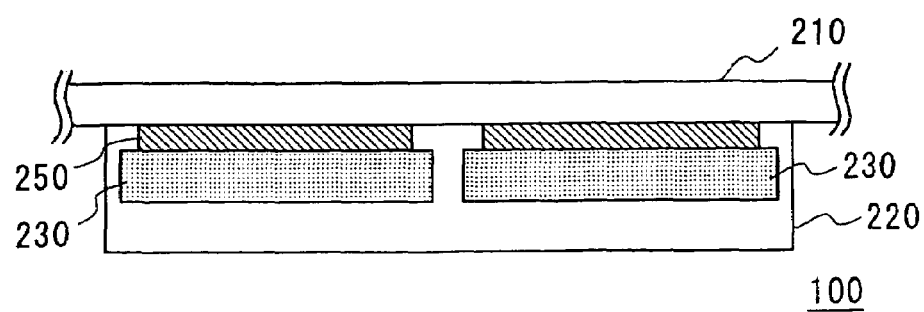

As shown in FIGS. 3A and 3C, separate transparent resin layers 250 may be formed between the front sides of the respective display panels 230 and the transparent front plate 210 without the transparent resin layer 250 being formed so as to cover the entire surface of the transparent front plate 210 in the rear frame 220 as shown in FIGS. 2A and 2C. FIG. 3A is a front view of the display device 100, and FIG. 3B is a side view of the display device, showing how the display device 100 is installed on the wall surface 260. FIG. 3C shows a cross-sectional structure at a cross-section taken along the line x-x' of FIG. 3A. Elements similar to those shown in FIGS. 2A to 2C are indicated by the same reference numerals, and the respective views shown in FIGS. 2A to 2C are not depicted in the same dimensions. The transparent resin layers 250, which are formed on the front sides of the respective display panels 230, are apart from each other. In FIGS. 3A to 3C, the transparent resin layers 250 are formed only between the front sides of the respective display panels 230 and the transparent front plate 210. The structure of the display device shown in FIGS. 3A to 3C are the same as the structure of the display device shown in FIGS. 2A to 2C except for the places where the transparent resin layers 250 are formed.

Figure 5A:
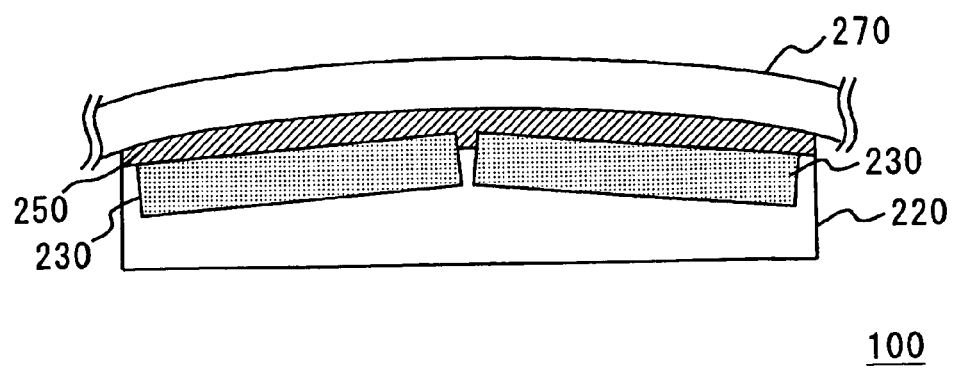
FIGS. 5A and 5B are schematic structural views of different example of the display devices according to the embodiments.
Figure 5B:
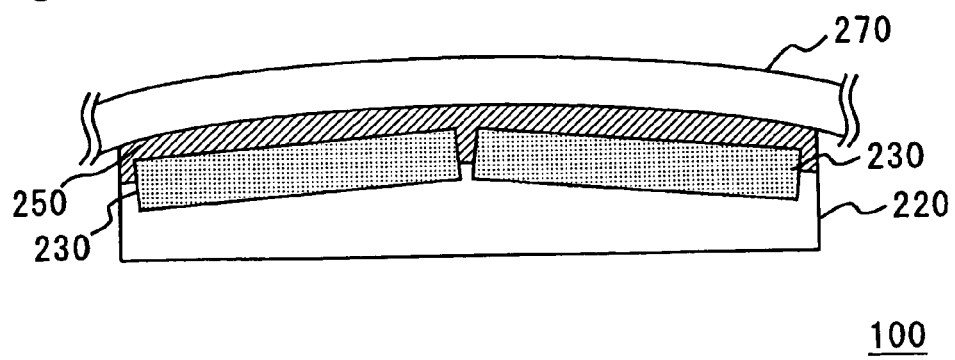

FIGS. 4A to 5B are schematic structural views of the display device 100 according to other preferred modes. FIG. 4A is a front view of the display device 100. FIG. 4B a side view, showing the state of display device 100 installed on the wall surface 260. FIG. 5A shows a cross-section taken along the line x-x' of FIG. 4A. FIG. 5B shows the cross-section of a different mode, taken along the line x-x' of FIG. 4A. The respective views shown in FIGS. 4A to 5B are not depicted in the same dimensions. Elements similar to those shown in FIGS. 2A to 2C are indicated by the same reference numerals, and explanation of these elements will be omitted. The display device 100 according to these modes includes a transparent front plate 270 formed in a roundish.

As shown in FIG. 5A, each of the display panels 230 has a surface disposed along the roundish surface of a transparent front plate 270. In other words, the respective display panels 230 are disposed so that the surfaces of the respective display panels are not parallel with each other and that the surfaces are positioned at an angle in accordance with the roundish surface. By this arrangement, it is possible to prevent a displayed image from being seen as being curved by the lens effect. As clearly shown in the transverse cross-section of FIG. 5A, the two display panels are disposed so as to be slanted as letters of "/" and "\".

A transparent resin layer 250 is formed in a space (gap) between the rear side of the transparent front plate 270 and the front sides of the display panels 230 and at a portion outside the space. The transparent resin layer is formed so as to cover the entire surface of the transparent front plate 270 in the rear frame 220. The transparent resin layer 250 has a portion occupying a space (gap) between the opposite sides of the two display panels 230 at a central portion of the transparent front plate 270. As shown in FIG. 5B, the transparent resin layer 250 may be formed so as to have the respective display panels 230 embedded therein in the rear frame 220. The display panels shown in FIGS. 4A to 5B are the same dimensions as the display panels shown in FIGS. 2A to 2C. The dimensions of the respective elements and the curved surface of the front plate may be determined, depending on an environment where the display device according to the present invention is installed.

In FIGS. 4A to 5B, an example wherein the transparent front plate 270 has both surfaces curved in a vertical direction is shown. By forming the transparent front plate 270 in a curved shape, it is possible to increase the strength against an external force to minimize the deformation of the transparent front plate 270. The curved shape of the transparent front plate 270 may be one curved in a single direction as shown in FIGS. 4A to 5B or one curved in two or more directions.

Figure 6A:
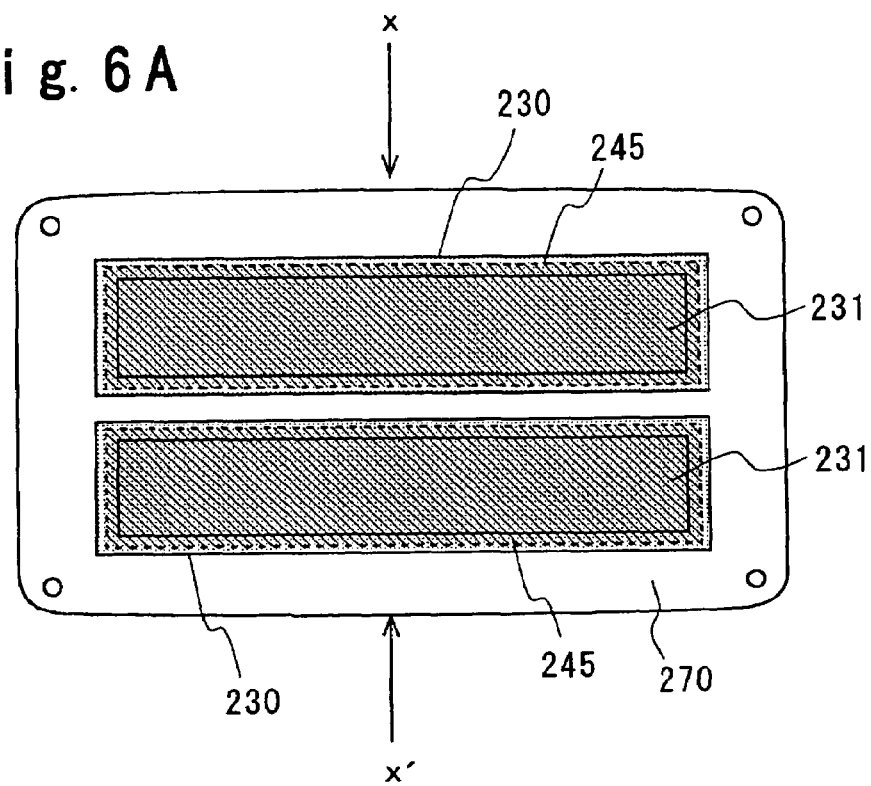
FIGS. 6A to 6C are schematic structural views of another example of the display device according to the embodiment.
Figure 6B:
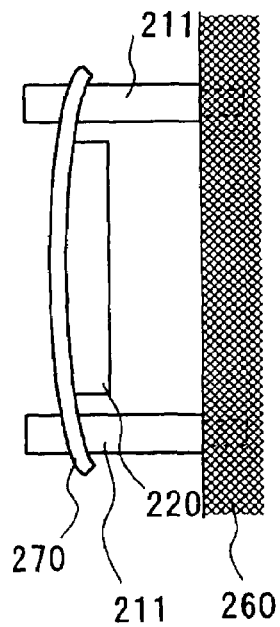
Figure 6C:
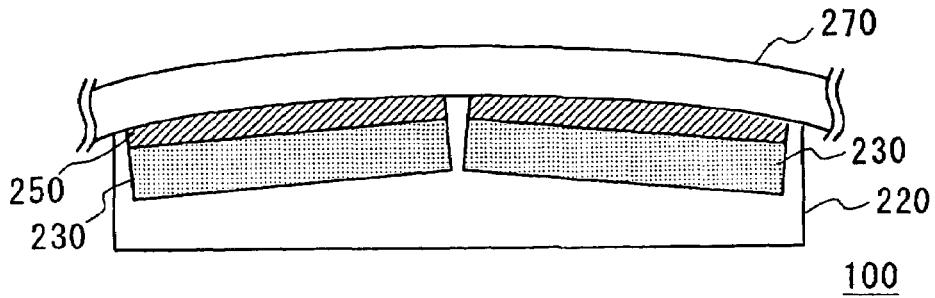

As in the display device 100 having the flat transparent front plate 210, the display device including the curved shape of transparent front plate 270 may have separate transparent resin layers 250 formed between the front sides of the respective display panels 230 and the transparent front plate 270 as shown in FIGS. 6A to 6C without the single transparent resin layer 250 being formed so as to the entire surface of the transparent front plate 270 in the rear frame 220. FIG. 6A is a front view of a display device 100, and FIG. 6B is a side view, showing the state of the display device 100 installed on the wall surface 260. FIG. 6C shows a cross-sectional structure at a cross-section taken along the line x-x' of FIG. 6A.

In FIGS. 6A to 6C, elements similar to those shown in FIGS. 4A to 5B are indicated by the same reference numerals. The respective views shown in FIGS. 6A to 6C are not depicted in the same dimensions. The transparent resin layers 250 that are formed on the front sides of the respective display panels 230 are apart from each other. In FIGS. 6A to 6C, the transparent resin layers 250 are formed only between the front sides of the respective display panels 230 and the transparent front plate 270. The structure of the display device shown in FIGS. 6A to 6C is the same as the structures of the display device shown in FIGS. 4A to 5B except for the positions where the transparent resin layers 250 are formed.

Figure 7:
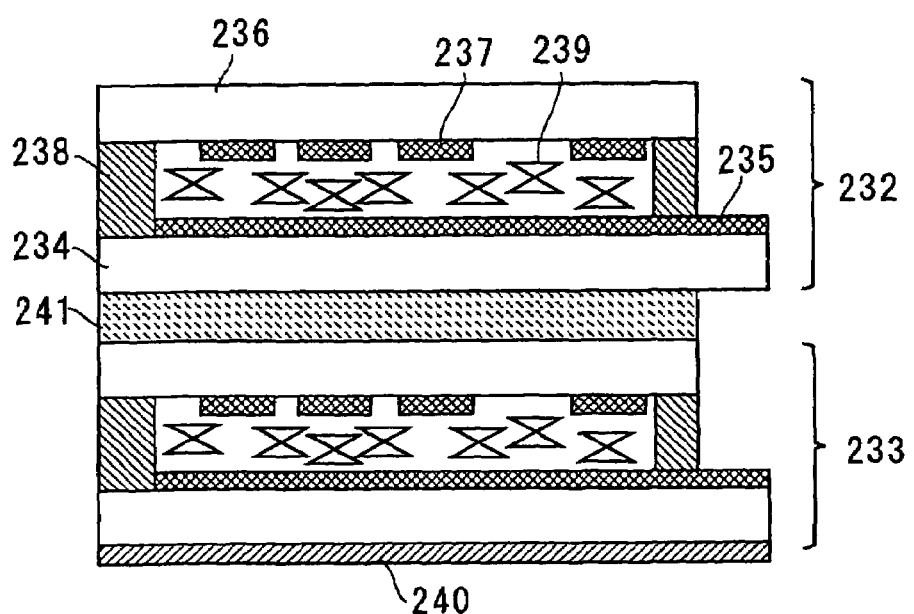
FIG. 7 is a schematic cross-sectional view of a two layer display panel, which is applicable to the display devices according to the embodiment.

FIG. 7 schematically shows an example of the cross-sectional structure of a chiral nematic liquid crystal display panel 230. The chiral nematic liquid crystal 230 has a phase transition mode and is stable in at least two phases of a planar state wherein incident light is partly selectively reflected and a focal conic state wherein incident light is scattered or transmitted. By applying a voltage across opposite electrodes, the liquid crystal can be transformed into the planar state or the focal conic state.

As shown in FIG. 7, the liquid crystal display panel comprises two of first chiral nematic liquid crystal display cell 232 and second chiral nematic liquid crystal display cell 233 layered therein, each of the first and second cells basically having the same cell structure. Each of the first and second cells has a first substrate 234 with a set of row electrodes 235 formed thereon and a second substrate 236 with a set of column electrodes 237 formed thereon disposed therein so that the set of row electrodes and the set of column electrodes extend perpendicular to each other. The first substrate 234 and the second substrate 236 are fixed together by a peripheral seal 238, and both substrates have a cell gap formed therebetween. The cell gap has a chiral nematic liquid crystal layer 239 sealed therein. Each set of the electrodes and the liquid crystal may be contacted each other through an insulating layer made of a metal-oxide film or a resin layer made of, e.g., polyimide. The chiral nematic liquid crystal panel 230 is preferably driven by passive matrix addressing.

The first substrate of the second cell has a colored layer 240 made of lusterless black paint formed on a rear side thereof. The first cell 232 and the second cell 233 have an adhesive layer 241 formed therebetween. Each of the chiral nematic liquid crystal layer 239 is driven by a voltage applied across row electrodes 235 and column electrodes 239 oppositely disposed. The transformation in the phase state of the liquid crystal layers is controlled to display an image. The chiral nematic liquid crystal display panel 230 can display a bright image with a wide viewing angle range since no polarizer is used.

The selective reflection properties of the first cell 232 and the second cell 233 may be modified to emit different colors, displaying a color image in plural colors. Typically, the ratio of a chiral compound to the liquid crystal material may be adjusted to control the dominant wavelength in selective reflection. The colored layer 240 may have any other color than black. For example, the colored layer may be blue and display a two color image in white and blue in combination with a selective reflection color in orange.

In other words, the chiral nematic liquid crystal display panel can set a luminous color in combination with selective reflection properties according to the application purpose. The chiral nematic liquid crystal display panel may be configured to have a single layer. The display panel may be configured to have three layers to provide a full-color display. The method for providing full-color display by a chiral nematic liquid crystal display panel has been disclosed in, e.g., JP-2003-315763.

The chiral nematic liquid crystal display panel 230 exhibits a memory effect. When the display panel is set in a display state by applying a voltage to column electrodes 237 on the second substrate 236, the display state is maintained even when the applied voltage is set at 0 V. By application of a signal voltage, the maintained display state can be transformed into another display state. Typically, when the entire active area is brought into the planar state, the display panel displays a selective reflection color, and when the entire active area is brought into the focal conic state, the display panel is in a slightly scattering state, displaying a lusterless color (black paint) on the rear side.

As explained, the chiral nematic liquid crystal display panel 230 exhibits a memory effect and is stable in a plurality of phase states. For example, when a surface of the liquid crystal display penal 230 is pressed by applying a stress to the liquid crystal material, the liquid crystal display panel has such a property that the phase state of the chiral nematic liquid crystal is transformed. The chiral nematic liquid crystal is stabilized in a phase state after transformation and maintains this phase state. From this viewpoint, there is a possibility that phase transition by a stress applied to the liquid crystal layer can cause an unexpected or undesirable change in the display state. This property is also applicable to many other memory type display panels. In a display device using a memory type display panel, it is significantly important to have a structure wherein a stress having a certain value or higher is prevented from being applied to the display panel.

As shown in FIGS. 2A to 6C, the display device 100 according to this embodiment includes the transparent front plate 210 or 270, which function as a protection plate for the chiral nematic liquid crystal display panels 230. The transparent front plate 210 or 270 comprises an inflexible transparent plate and restrains the transmission of an external force from a surface of the display device 100 to the display panels 230. From the viewpoint of protection from an external force, it is preferable to use a glass sheet having a thickness of several mm or more. Between the transparent front plate 210 or 270 and each of the display panels 230 a transparent resin layer 250 is formed. A stress, which is caused by an external force after installation of the display device 100 or is applied to a display panel 230 by distortion of the display device 100 caused by fabrication or installation, can be effectively reduced to avoid a change in the display state by the transparent resin layer 250.

In order to effectively reduce the stress applied to a display panel 230, the transparent resin layer 250 may be made of a transparent elastic resin. In order to restrain the stress applied to a display panel 230 as much as possible, it is preferable that the transparent resin layer 250 be made of a material having a low elastic modulus. With respect to the transparent resin having a low elastic modulus, the resin has a glass transition temperature of preferably 0° C. or below, more preferably −20° C. or below. The tensile elasticity at a temperature that the display device is normally used (25° C.) is preferably 100 MPa or below, or preferably 10 MPa or below. In particular, the tensile elasticity is more preferably 1 MPa or below.

Examples of the material for the elastic resin are silicone, acryl and urethane. One of preferred materials for the transparent elastic resin is a silicone resin. A preferred example of the silicone resin is a two-component thermosetting silicone, SE1740 (A/B), manufactured by Dow Corning Toray Silicone Co., Ltd. Although it is preferable to use a resin having a crosslinked molecular structure in terms of property stability at a high temperature, it is acceptable to use a slightly mobile transparent resin in a gel state.

Additionally, a particularly preferred material for the transparent resin layer or layers 250 is a transparent resin in a gel state. The resin in a gel state is significantly good at stress absorption in comparison with hard elastic resin, such as a resin in a rubber state. For example, a residual stress, which is caused in a display panel 230 by a difference in thermal expansion created by a heat cycle test, or a stress, which is caused by deformation of the transparent front plate 210 or 270 created by fixing the transparent front plate 210 or 270 to the wall surface 260 with the jigs 211, can be effectively absorbed to effectively restrain the occurrence of chrominance non-uniformity in a display panel 230.

When using a transparent resin in a gel state, the consistency of the transparent resin in a gel state as a transparent resin layer 250 is set at an adequate value in order to effectively fix the display panels 230 to the transparent front plate 210 or 270. In particular, in determination of the consistency of the transparent resin layer or layers in a gel state 250, it is important to consider the suppression of a stress caused in the display panels 230 or the positional shift of the display panels 230. In order to restrain the stress applied to the display panels 230 as much as possible, it is preferable to set the consistency at a greater value. However, when the consistency is too great, the positional shift of a display panel occurs since the display panel 230 can not be held appropriately. From this viewpoint, it is preferable that the transparent resin layer or layers in a gel state 250 have a ¼ consistency of from 5 to 800 (JIS K2220). It is more preferable that the transparent resin layer or layers have a ¼ consistency of from 10 to 500 (JIS K2220).

Examples of the material for the transparent resin layer or layers in a gel state 250 are silicone, acryl and urethane. From the viewpoint of restrain the occurrence of bubbles in a fabricating process, it is preferable to use a silicone resin, which is a material having a small surface tension. A preferred example of the silicone resin in a gel state is a two-component curable silicone, which has a gel state after being cured. Since the cured resin layer is formed in a closed space, it is preferable to use a two-component curable silicone containing no volatile solvent instead of a one-component curable resin containing a volatile solvent. For example, it is possible to form the transparent resin layer or layers 250 by using a two-component thermosetting silicone "SE1885 (A/B)" manufactured by Dow Corning Toray Silicone Co., Ltd. The method for using a two-component thermosetting silicone to form the transparent resin layer or layers 250 will be described later.

The thickness of the transparent resin layer or layers in an elastic or gel state 250 is set at an adequate value from the viewpoint of structural strength, a reduction in a-stress applied to the display panels and so on. For example, when the display device 100 includes a transparent front plate 210 having a thickness of about 4 mm and display panels 230 having a thickness of about 4 mm, the transparent resin layer or layers 250 may be formed so as to have a thickness of about 1 mm. The transparent resin layer or layers 250 may be configured to have a single layer or more than one layer. When the transparent resin layer or layers 250 are configured so as to have a plurality of layers, the respective layers of the transparent resin layer or layers may be made of a similar material or different materials, which are appropriately selected.

Although an optical member other than the transparent resin layer or layers 250 may be disposed between the display panels 230 and the transparent front plate 210 or 270, it is preferable that no air layer be formed between respective members at the portions between the display panels 230 and the transparent front plate 210 or 270. A planar UV cut film as an optical member may be embedded in the transparent resin layer or layers. By layering the display panels 230 and the transparent front plate 210 or 270 without an air layer being interposed therebetween, it is possible to restrain the reflection of light caused by a change in the refractive index between adjacent layers. By this arrangement, it is possible to eliminate antireflection treatment to the front sides of the display panels 230 and the rear side of the transparent front plate 210. When an air layer is formed, it is preferable that the rear side of the transparent front plate and the front sides of the display panel be subjected to antireflection treatment.

Preferably, the transparent resin layer or layers 250 are brought into contact with and are fixed to the display panels 230 and the transparent front plate 210 or 270, providing interfaces. Fixing means not only a case wherein the transparent resin layer or layers are fixed so as to be substantially prevented from being separated but also a case wherein the transparent resin layer or layers are bonded so as to be capable of being separated by application of an external force having more than a certain value. From the viewpoint of antireflection, it is preferable that the refractive index of the transparent resin layer or layers 250 be approximate to the refractive indices of the contacting surfaces of the display panels 230 and the transparent front plate 210 or 270.

It is preferable that the transparent resin layer or layers 250 be formed so as to cover substantially the entire surface of the active areas of the display panels 230 as stated earlier. By this arrangement, it is possible to effectively restrain the application of an external force to the entire active areas through the transparent front plate and to avoid an undesirable change in the display state. By covering the entire front sides of the active areas with the same material, it is possible to prevent the active areas from having different display states.

When using a liquid crystal material in the display panels 230, it is necessary to consider a degradation in the liquid crystal material caused by ultraviolet light. In order to effectively filter out ultraviolet light, it is preferable that the transparent resin layer or layers 250 contain an ultraviolet absorbent. It is preferable that the ultraviolet absorbent have a steep ultraviolet filtering property for a wavelength of 400 nm or below. Depending on the kind of a used liquid crystal material, it is preferable to select the molecular structure or the adding amount of the ultraviolet absorbent so as to steeply filter out incident light having a wavelength of 410 nm or below. It is acceptable to select the molecular structure or the adding amount so as to absorb incident light having a longer wavelength in such a range wherein the display quality of the liquid crystal display panels is not degraded. When using a silicone resin to form the transparent resin layer or layers 250, a preferred ultraviolet absorbent is a material represented by the following chemical formula. This ultraviolet absorbent is soluble in silicone resins, does not bleed out during low temperature storage and is able to effectively absorb ultraviolet light having a long wavelength.

Chemical Formula 1

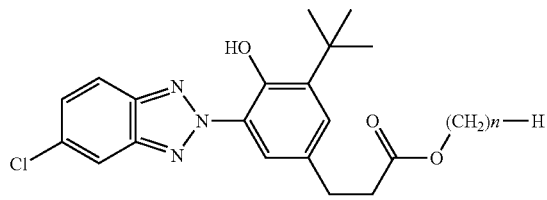

The transparent resin layer or layers 250 according to this embodiment are applicable to not only a display device using a memory type display panel but also a display device using another type of display panel. The provision of the transparent resin layer or layers 250 can reduce a stress applied to the display panels, preventing the display panels from causing failure.

Now, a method for fabricating the display device 100 will be explained. Explanation will be made on an example wherein a pair of chiral nematic liquid crystal display panels, which are a preferred mode of the display panels, are fabricated. First, two substrates, each of which has a transparent conductive layer made of ITO on a surface, are prepared for each of the panels. The ITO layers of the respective substrates are patterned by being subjected to photographic processing and etching treatment. The ITO pattern formed on each of the substrate comprises about 220 of row electrodes having a maximum gap of about 10 μm and about 1440 of column electrodes having a maximum gap of about 10 μm.

Next, after having formed an electric insulating layer on the surface of each of the substrates with the electrodes formed thereon, a resin solution of polyimide is applied on the insulating layer and baked to form an alignment layer on the insulating layer. In an example, the alignment layer may be used as it is without being subjected to rubbing treatment. The paired substrates are disposed so as to have the respective sets of striped electrodes extending perpendicular to each other, and spacers having a diameter of about 4 μm are scattered between the opposed surfaces of the paired substrates. A peripheral seal, which is made of an epoxy resin containing a slight amount of glass fibers having a diameter of about 4 μm, is applied to the four sides of each of the substrates except for a portion used as a liquid crystal injection port. The paired substrates are bonded together to fabricate a liquid crystal cell.

Next, a chiral compound is blended into a nematic liquid crystal material to prepare a chiral nematic liquid crystal composition. The helical pitch can be controlled by selecting the kind of the liquid crystal material, the kind of the chiral compound, and the blend ratio of both materials. By adjusting the kinds and the blend ratio along with the refractive index of the liquid crystal used, it is possible to control the wavelength of selective reflection light in a planar state. After having injected the chiral nematic liquid crystal composition into the space between the substrates of each of the liquid crystal cells through the injection port by using a vacuum injection method, the injection port is sealed with a photocurable resin or a thermosetting resin to fabricate chiral nematic liquid crystal display cells. Each of the chiral nematic liquid crystal display panels is equipped with circuits, such as a driver circuit and a control circuit.

Figure 8A:
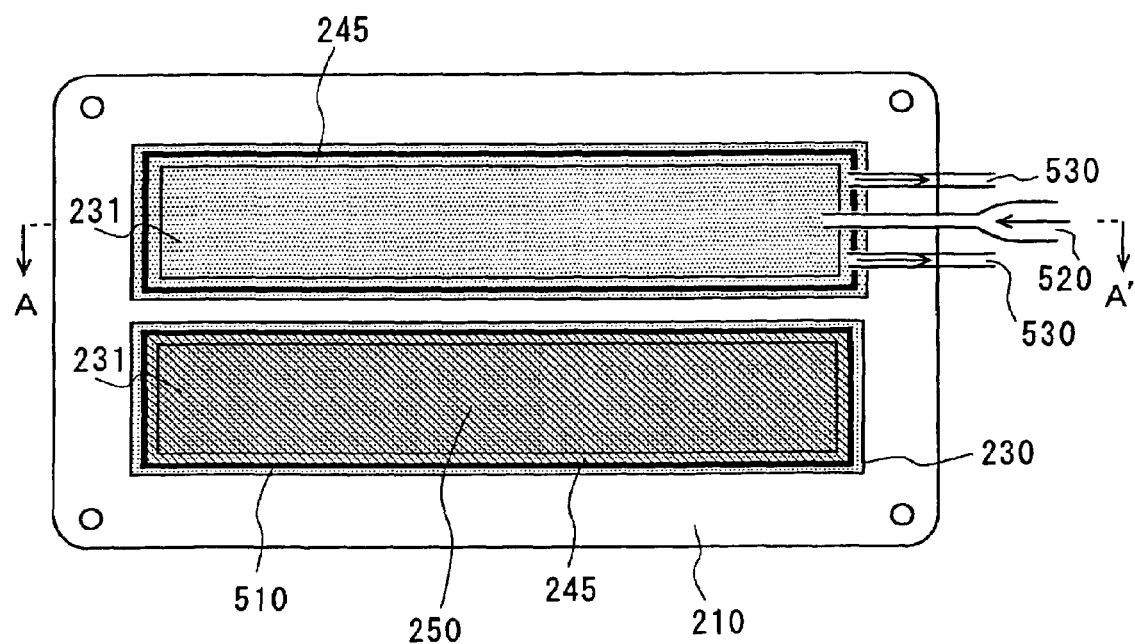
FIGS. 8A and 8B are schematic structural views explaining the injection process for a display device, according to an embodiment of the present invention.
Figure 8B:
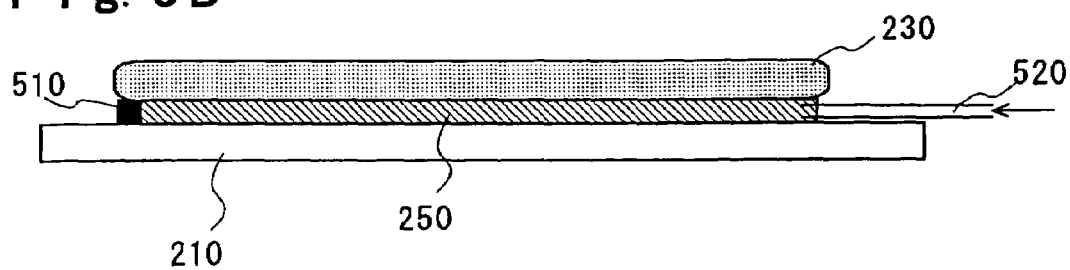

A method wherein each of the chiral nematic liquid crystal display panels thus prepared is fixed to the transparent front plate 210 will be explained. Although explanation will be made on a case wherein the transparent resin layers in a gel state 250 are formed, a rubber-like elastic resin may be used to fix the display panels to the transparent front plate in accordance with the following method. FIGS. 8A and 8B show an example of the method for fixing the display panels 230 to the transparent front panel 210. FIG. 8A is a front view showing the example of the fixing method, and FIG. 8B is a cross-sectional view taken along the line A-A' of FIG. 8A. In the following explanation, the fabrication method according to an embodiment of the present invention (showing a step for injecting a resin into an upper display panel) will be disclosed in the case of the display device 100 shown in FIGS. 3A to 3C.

Double-sided adhesive tapes 510 are affixed on the display panels 230 or the transparent front plate 210. The tapes 510 are affixed so as to be disposed in the outer peripheral areas 245 of the active areas 231 of the display panels 230 finally. Another resin, which has a good wetting property with respect to the transparent liquid resin, i.e., to be capable to making the contacting angle to the liquid resin smaller, may be applied to the surface of each of the double-sided adhesive tapes 510 in contact with the liquid resin. This mode is preferable since it is possible to reduce the generation of unnecessary bubbles during injection of the liquid resin. For example, when a silicone resin is as the transparent liquid resin, it is preferable to apply a fast curable silicone resin to the relevant side of each of the double-sided adhesive tapes. In this embodiment, the two display panels have the double-sided adhesive tapes 510 affixed on the outer peripheral areas 245, respectively.

Next, the transparent front plate 210 and the display panels 230 are overlapped, being positioned so that the opening in each of the black outer peripheral areas is superposed on the active area of a corresponding display panel 230. Each of the tapes 510 surrounding the active areas is affixed so as to have an injection port for injecting the liquid resin and evacuation ports for evacuating air formed therein. It is preferable that the injection port and the evacuation ports be formed on the same side. The liquid resin is injected through the injection port of each of the tapes by using an injection needle 520. Air evacuation during injection of the liquid resin is performed by inserting an air evacuation needle 530 into each of the evacuation ports.

In order to reduce the stress applied to the display panels due to distortion, it is preferable that the resin material be selected from ones having a small shrinkage factor in the curing step. Preferably, a two-component silicone resin is used. In order to avoid the generation of bubbles, a liquid resin material, which has a low viscosity and a small surface tension, is preferably selected as the injected liquid resin material. In particular, it is preferable that the viscosity of the liquid resin material before curing be 2,000 mPaS or below (at 25° C.). As the two-component silicone resin, it is possible to use, e.g. a two-component thermosetting silicone "SE1885 (A/B)" manufactured by Dow Corning Toray Silicone Co., Ltd. As the ultraviolet absorbent to be blended into the liquid resin material, it is possible to use a ultraviolet absorber "TINUVIN 109" manufactured by Ciba Specialty Chemicals K.K., wherein n is equal to 8 in Chemical Formula 1.

Since the resin in a gel state has a short pot life (a period of time from mixture of two components to commencement of curing), it is preferable to blend a retarder into the liquid resin material. In this mode, it is possible to effectively restrain the viscosity of the liquid resin from being increased because of faster development in the resin curing step than needed in, e.g., a case wherein the injection time is long since the display panels 230 are large. As the retarder, it is possible to use, e.g., a "Retarder-2" for LTV manufactured by Dow Corning Toray Silicone Co., Ltd. The compositions of the respective materials are designed so as to have adequate values. For example, it is possible to adopt a ratio of SE1885A:SE1885B:TINUVIN 109: retarder=50 parts:50 parts:0.5 part:8 parts. In preparation of the injected liquid resin material comprising these materials, first, a mixed liquid A is obtained by adding TINUVIN 109 to 1885A and mixing both materials. Additionally, a mixed liquid B is obtained by adding the retardant to 1885B and mixing both materials. The mixed liquid A and the mixed liquid B are mixed to obtain a mixed liquid C. The mixed liquid C is stirred and mixed for a certain period of time (e.g., 10 min). After that, the mixed liquid C is depressurized and degassed (e.g. from $2.00 \times 10^4$ Pa to $0.01 \times 10^4$ Pa in 10 min). In this manner, the liquid resin material to be injected is obtained.

When the step for potting the liquid resin has been completed, the ports are sealed, and the liquid resin is cured by heat treatment. It is preferable in terms of easy production that a resin capable of being cured at 80° C. or 60° C. be selected in order to prevent the display panels 230 from being adversely affected by the heat treatment. It is acceptable to use a resin, which is cured at room temperature for a long period of time. In this case, a residual stress caused by curing can be reduced in the best way. In the cases of the liquid resin materials mentioned above, it is possible to form the transparent gel-like resin layers 250 by curing at 60° C. for 60 min or at room temperature for 24 hr. Finally, the rear frame, which is made of, e.g., aluminum, is fixed to the rear side of the transparent front plate so as to house the display panels 230.

Instead of the double-sided adhesive tapes 510, a fast curable silicone resin may be used to temporarily fix the display panels to the transparent front plate. For example, double-sided adhesive tapes, which have a thickness of from 0.1 to 2.0 mm, are affixed on some portions of the display panels 230 or the transparent front plate 210 to position the display panels and the transparent front plate, and then, the fast curable silicone resin is injected into the gap between each of the display panels 230 and the transparent front panel 210 from around each of the display panels. Thus, it is possible to form a sealed space except for ports for injection of the liquid resin material. The transparent resin layers 250 can be formed by performing injection of the liquid resin material and evacuation through the ports of the sealed space in the same way as stated earlier, and by heat-curing the liquid resin material or curing the liquid resin material at room temperature.

Next, the method for fabricating the display device 100 according to another preferred embodiment will be explained. The display panels 230 may comprise chiral nematic liquid crystal display panels, which have been formed in the same way as the embodiment stated above. In this embodiment as well, the transparent resin layer 250 is formed by curing the liquid resin material, which is injected between the display panels 230 and the transparent front plate 210. The method according to this embodiment may be utilized to form a transparent resin layer made of an elastic resin. Now, explanation of the fabrication method according to this embodiment will be made on the display device 100 shown in FIGS. 2A to 2C as an example.

Figure 9:
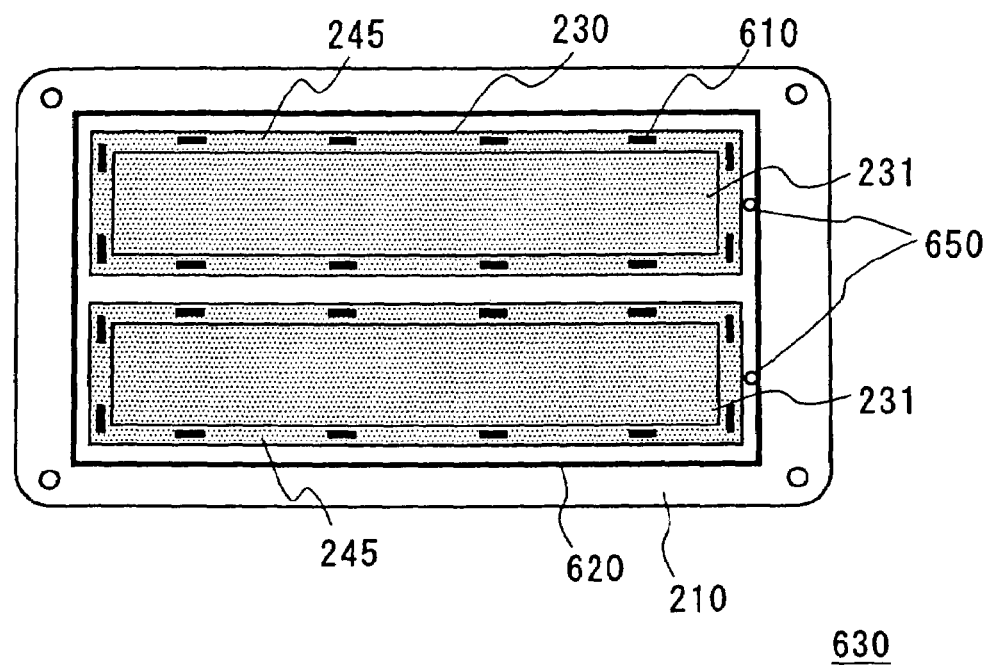
FIG. 9 is a schematic view to explain a fabrication step for a display device, according to another preferred embodiment of the present invention.
Figure 10:
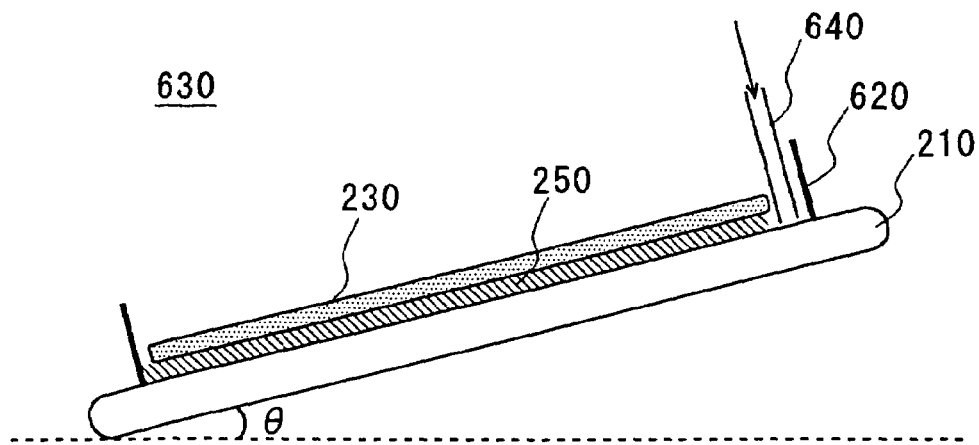
FIG. 10 is a schematic structural view to explain the injection process according to another preferred embodiment.

A method wherein the chiral nematic liquid crystal display panels, which have been prepared in the same way as the embodiment stated earlier, are fixed to the transparent front plate 210. FIGS. 9 and 10 show a preferred embodiment of the method for fixing the display panels 230 to the transparent front plate 210. Plural double-sided adhesive tapes 610 as an example of fixing members are affixed on the display panels 230 or the transparent front plate 210. The double-sided adhesive tapes 610 are affixed so as to be disposed in the outer peripheral areas 245 around each of the active areas 231 of the display panels 230 finally.

As shown in FIG. 9, the plural double-sided adhesive tapes (cut pieces of a double-sided adhesive tape) 610 are affixed at intervals so as to surround each of the active areas 231 of the respective display panels 230 so that a spacing (port) is formed between adjacent double-sided adhesive tapes 610. The respective double-sided adhesive tapes 610 are used to temporarily fix the display panels 230 to the transparent front plate 210 for tacking the display panels 230 to the transparent front plate 210 in the fabrication step, positioning the display panels 230 at desired positions.

By disposing the plural double-sided adhesive tapes 610 at intervals as stated earlier to temporarily fix the display panels 230 to the transparent front plate 210 at plural spots, it is possible to effectively restrain a display panel 230 from being deformed to generate chrominance non-uniformity by a stress applied to the display panel from the transparent front plate 210 through a double-sided adhesive tapes 610. Preferably, each of the double-sided adhesive tapes 610 has a side in contact with the liquid transparent resin coated with a resin having good wetting property with respect to the liquid transparent resin since it is possible to reduce the generation of unnecessary bubbles during injection of the liquid resin. This is just as the other embodiment stated above. In this embodiment, the two display panels 230 have the double-sided adhesive tapes 610 affixed on the peripheral areas 245, respectively.

Next, the transparent front plate 210 and the display panels 230 are positioned one over the other so that the opening inside each of the black outer peripheral areas of the transparent front plate overlaps with the active area of the corresponding display panel 230, respectively. A frame 620 is disposed on the rear side of the transparent front plate 210 so as to surround the periphery of a combination of the two display panels 230. The frame 620 is fixed to the transparent front plate 210 by sealing the gaps between the frame 620 and the transparent front plate 210 with a silicone resin or the like. The frame 620, which forms the side wall of the rear frame 220, may be formed of aluminum or another material. For example, the frame 620 is disposed so that the frame 620 is apart from the edges of the combined display panels 230 by a distance of from about 1 to about 2 mm.

Subsequently, an assembly 630, which comprises the transparent front plate 210, the display panels 230 and the frame 620, is put in a vacuum chamber, and the inside of the vacuum chamber is depressurized. The inside of the vacuum chamber preferably has a degree of depressurization of from $1.33 \times 10^4$ Pa to $6.67 \times 10^4$ Pa. By this treatment, the display panels 230 and the space injected by the liquid resin are also depressurized to such a degree of depressurization. In this embodiment, the liquid resin material is injected in the vacuum chamber thus depressurized. By depressurization, in particular at a degree of depressurization in the range stated above, it is possible to effectively restrain the generation of bubbles during injection of the liquid resin material.

In order to prevent the display panels 230 from being adversely affected by deformation, it is preferable that the degree of depressurization be $1.33 \times 10^4$ Pa or above. In the other embodiment just stated above, when the space between each of the display panels 230 and the transparent front plate 220 is depressurized, the display panels 230 may be deformed. In accordance with this embodiment, it is possible to effectively prevent the display panels 230 from being deformed by injecting the liquid resin material in the vacuum chamber.

As shown in FIG. 10, the liquid resin material is injected in the vacuum chamber. Injection tubes or injection needles 640 is inserted between the frame 620 and each of the display panels 230, and the assembly 630 is inclined. For example, one injection needle 640 may be inserted at an insertion position 650 between a short side end of each of the two display panels 230 and the side of the frame 620 close to the short side edge. Injection of the liquid resin material may be simultaneously performed, using two injection needles 640.

The liquid resin material may be injected by use of a single injection needle 640 or in several batches. It is possible to effectively eliminate bubbles generated by injection of the liquid resin material since the bubbles is easily move in the liquid resin material by inclining the assembly 630. Although the assembly 630 is inclined so as to have a side with an injection needle 640 inserted raised in order to accelerate the injection of the liquid resin material as shown in FIG. 10, the assembly 630 may be inclined in another way. An inclination angle θ is preferably from 5 to 30° with respect to the horizontal.

While the assembly 630 is inclined, the liquid resin material is injected through the injection needles 640. The inclination angle of the assembly 630 is preferably modified according to the state of injection of the liquid resin material. In particular, it is preferable that the inclination angle be set at a certain angle at the commencement of injection of the liquid resin material, and that the inclination angle is gradually reduced as the injection of the liquid resin material progresses. By gradually reducing the inclination angle as the injection of the liquid resin material progresses, it is possible to more effectively perform elimination of the bubbles.

For example, the inclination angle may be modified in plural steps so that the inclination angle at the commencement of injection of the liquid resin material is set at an angle of from 10 to 30 deg, the inclination angle is changed to an angle of from 2 to 10 deg at a certain timing, and then the inclination angle is set at an angle of 0 deg. The inclination angle may be set or modified by inclining the assembly 630 or the vacuum chamber with the assembly 630 housed therein.

The liquid resin material is injected from the injection needles 640 in such a state that the assembly 630 is inclined. The liquid resin material flows into the space between each of display panels 230 and the transparent front plate 210 through the spacing between adjacent double-sided adhesive tapes 610. A liquid resin material, which has a low viscosity and a small surface tension, is preferably selected as the injected liquid resin material in order to minimize the generation of bubbles. In this embodiment, each of the display panels 230 does not have a peripheral portion completely closed by the double-sided adhesive tapes 610. The liquid resin material, which has been injected through the injection needles 640, flows out of the space between each of the display panel 230 and the transparent front plate 220 through the spacing between adjacent double-sided adhesive tapes 610.

For the sake of this matter, the liquid resin material having low mobility is employed. And the viscosity of the liquid resin material preferably has a certain value or above. From this viewpoint, it is preferable that the liquid resin material have a viscosity of from 100 to 2,000 mPaS (at 25° C.) before being cured. With respect to a specific liquid resin material, a specific ultraviolet absorbent and a specific retarder, the same materials as the fabricating method according to the other embodiment just stated above may be used. Specific explanation of these materials will be omitted.

Preferably, the surface of each of the display panels 230 in contact with the transparent resin layer 250 has an uncured liquid resin material applied thereof in advance. By applying the liquid resin material on the surface of each of the display panels 230 facing the transparent front plate 210 in advance, it is possible to improve the wetting property with respect to the injected liquid resin material and to effectively restrain the generation of bubbles caused by injection of the liquid resin material. The surface of the transparent front plate 210 in contact with the liquid resin material may also have the liquid resin material applied thereon in advance.

When the liquid resin material is injected through the injection needles 640 in such a state that the assembly 630 is inclined, the liquid resin material flows out of the spacing between adjacent double-sided adhesive tapes 610. In this embodiment, the entire periphery of the combined display panels 230 is surrounded by the closed frame 620. Accordingly, the frame 620, which is disposed around the outer periphery of the combined display panels 230 can prevent the liquid resin material from flowing out. Thus, even when the display panels 230 and the transparent front plate 210 are fixed only at several spots, the transparent resin layer 250 can be adequately formed by curing the liquid resin material between each of the display panels 230 and the transparent front plate 210. The transparent resin layer 250 is formed so as to be filled in the space between each of the display panels 230 and the transparent front plate 210 and the spacing between adjacent double-sided adhesive tapes 610 so that the transparent resin layer covers substantially the entire area of the surface of the transparent front plate 210 in the frame 620.

When the step for potting the liquid resin has been completed, the liquid resin is cured by heat treatment. In order to prevent the display panels 230 from being adversely affected, it is preferable in terms of easy production to select a resin, which is cured at 80° C. or 60° C. It is acceptable to use a resin, which is cured at room temperature for a long period of time. These points are the same as the fabrication method according to the other embodiment just stated above. Finally, the frame 620 has an upper opening closed by a top cover.

Figure 11:
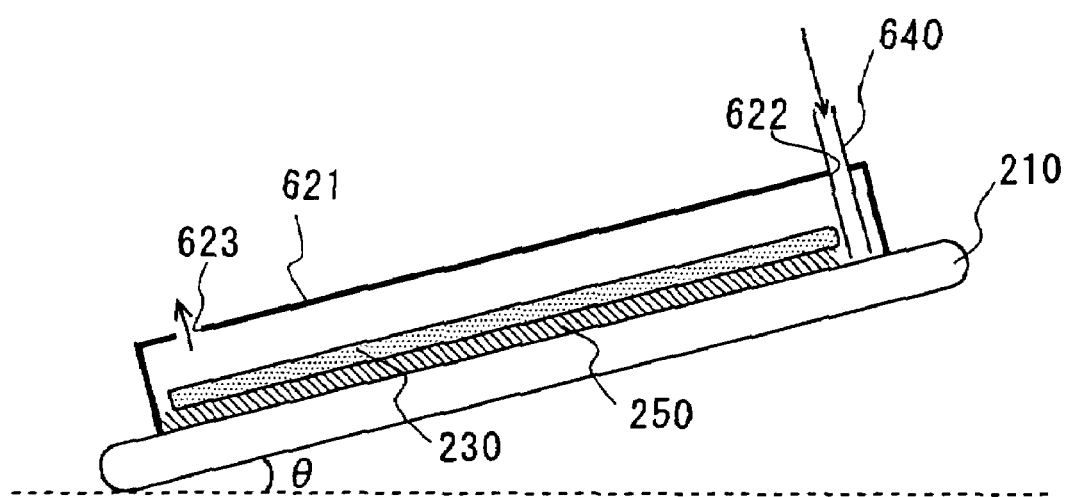
FIG. 11 is a schematic structural view to explain the injection process according to another preferred embodiment.

Although explanation has been made on a case wherein the liquid resin material is injected under a depressurized state in the chamber, a frame, which surrounds the entire periphery of the combined display panels 230, may be fixed on the transparent front plate 210 to form a sealed space, and the inside of the frame may be depressurized. A frame 621 is fixed to the front plate 210 as shown in FIG. 11. The frame 621 is a box-like member surrounding the periphery of the combined display panels 230. The frame has an injection port 622 formed therein to inject the liquid resin material. An injection needle 640 is inserted into the injection port.

The frame 621 also has an evacuation port 623 formed therein to evacuate a gas. By evacuating the gas in the frame 621 through the evacuation port 623, the display panels 230 and the space to inject the liquid resin can be depressurized. The preferred degree of depressurization is the same as in the embodiment just stated above. As shown in FIG. 11, the injection port 622 and the evacuation port 623 are formed in an upper wall of the frame 621 (a surface opposite to the transparent front plate 210). The frame 621 may comprise a plurality of members. In particular, the upper wall of the frame 621 preferably comprises a transparent plate-like member, which is configured so as to effectively avoid deformation under depressurization. By this arrangement, it is possible to check the state of the injection of the liquid resin material.

Figure 12:
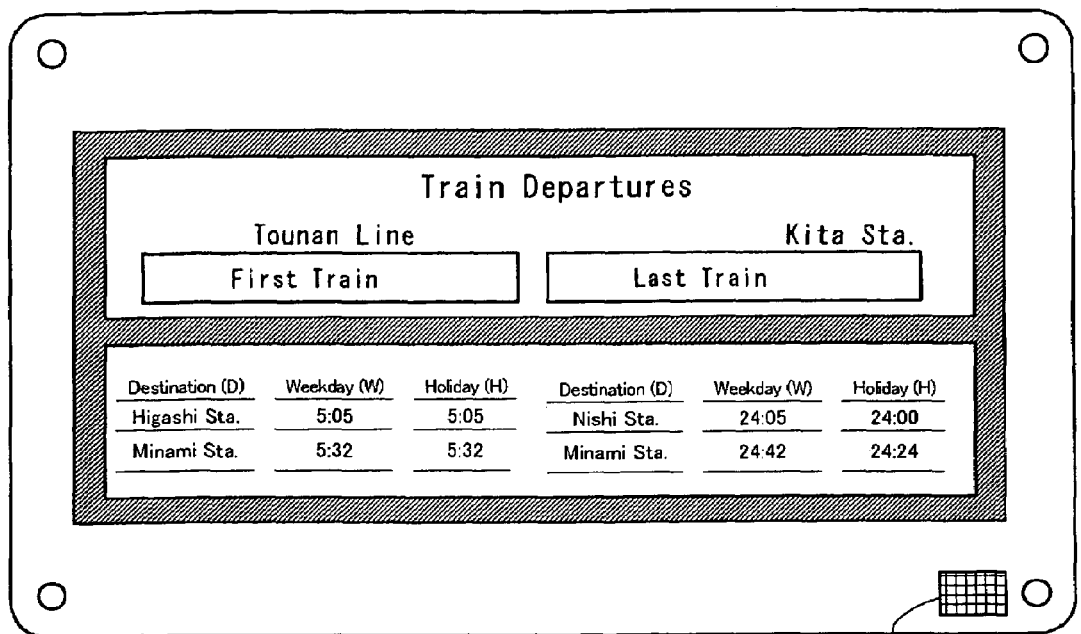
FIG. 12 is a schematic view to explain the control method of the display device according to an embodiment of the present invention.
Figure 12:

The display device is provided with display data and control signals from an external computer. It is possible to use wire communication, such as RS232C or wireless communication using an infrared ray or a radio wave. FIG. 12 shows a preferred mode to control the display device 100. Preferably, the display device 100 is controlled by wireless communication. A controller 701 may include hardware or a combination of software and hardware. FIG. 12 shows an example wherein the display device 100 is controlled by a computer with software installed.

The transparent front plate 210 of the display device 100 may have the rear side or the front side formed with an antenna 702 for wireless communication. The antenna may be formed by a printed pattern using electrically conductive ink. In this way, it is possible to reliably control the display device by wireless communication. By configuring the display device 100 so as to control display contents by wireless communication, the display device can be adapted to various kinds of installation sites. Actually, it is possible to easily change the display contents while the display device 100 is installed.

In order to display desired image data on the display device 100, the controller 701 produces bitmap image data according to the screen size of the display device 100. The bitmap image data may be produced by a user's input or be preset in a memory. Subsequently, the bitmap image data are converted into display data, which can be displayed on the chiral nematic liquid crystal display panels.

When chiral nematic liquid crystal display cells, which reflect different colors, are layered as shown in FIG. 7, it is possible to display a multi-color image. In the shown example, two chiral nematic liquid crystal display cells are layered so as to form a panel. The respective cells display complementally colors (blue and yellow), respectively. A colored layer, which emits a black color, is disposed on the rear surface of the rear side substrate of the panel. Specifically, the respective colors of RGB (each of R, G and B comprising 8 bits) are provided with arbitrary values, and threshold values are compared with shading levels of each of R, G and B colors. Thus, the colors of RGB are reproduced in 1 to 8 bits so as to obtain 8 colors (black, blue, green, cyan, red, magenta, yellow and white) as reproduced colors by RGB. Description on this technique is disclosed in, e.g., JP-A-2003-315763.

For example, in the case of a reproduced grey color of (R, G, B)=(128, 128, 128) in a bitmapped image of 24 bits/256 grey scales), when the threshold value is set at a value of lower than 127, the grey color is converted into a white color. When the threshold value is set at a value of 128 or above, the grey color is converted into a black color. Reproduced colors by RGB are limited, and color attributes are added to the reproduced colors so as to correspond to 4 colors (black, blue, yellow and white). Thus, the reproduced colors by RGB are converted into 4 colors, which can be displayed by the chiral nematic liquid crystal display panels.

Color display is performed on the panel structure with four colors (green, cyan, red and magenta) in image data comprising 8 colors being modified "from green to yellow", "from cyan to white", "from red to orange" and "from magenta to blue". The display data that have been converted for display on the chiral nematic liquid crystal display panels are transmitted to the display device 100 by wireless communication, using, e.g. Bluetooth (registered trademark) technique or the like.

The display device 100 may include a plurality of memories as storages for storing display data. Transmitted display data are stored in one of the memories. By designating a memory from the controller 701, display data can be stored in a specific memory, and the display data stored in the specific memory can be displayed on an active areas of the display device 100.

The entire disclosures of Japanese Patent Application No. 2003-299197 filed on Aug. 22, 2003, Japanese Patent Application No. 2003-420063 filed on Dec. 17, 2003, Japanese Patent Application No. 2003-420065 filed on Dec. 17, 2003 and Japanese Patent Application No. 2004-214986 filed on Jul. 22, 2004 including specifications, claims, drawings and summaries are incorporated herein by reference in their entireties.

What is claimed is:

1. A display device comprising:
    a display panel having an active area to display an image;
    a transparent front plate disposed in front of the display panel;
    a transparent resin layer in a gel state, the resin layer formed between the front plate and the active area; and
    a frame connected to the transparent front plate and configured to cover the display panel such that a void is formed between the display panel and the frame.

2. The display device according to claim 1, wherein the transparent resin layer is formed so as to cover a substantially entire region of the active area.

3. The display device according to claim 1, wherein the transparent resin layer has a ¼ consistency of from 5 to 500.

4. The display device according to claim 1, wherein the transparent resin layer is formed by curing a two-component liquid resin material injected into between the display panel and the front plate.

5. The display device according to claim 4, wherein the liquid resin material has a viscosity of 100 to 2,000 mPaS (at 25° C.).

6. The display device according to claim 4, wherein the liquid resin material includes a retarder.

7. The display device according to claim 1, wherein the active area and the front plate have a layered structure formed therebetween without interposition of an air layer.

8. The display device according to claim 1, wherein the display panel displays images in a plurality of memory type display states.

9. The display device according to claim 1, wherein the front plate comprises an inflexible glass plate.

10. The display device according to claim 1, wherein the front plate has a curved shape.

11. The display device according to claim 1, wherein the display panel comprises a liquid display panel, and the transparent resin layer contains an ultraviolet absorber.

12. The display device according to claim 1, wherein the resin layer is disposed at least between the display panel and the front plate.

13. The display device according to claim 1, wherein the frame comprises:
    an injection port through which a resin is inserted to form the resin layer; and
    an evacuation port through which air inside the frame is evacuated.

14. A display device comprising:
    a display panel having an active area to display an image;
    a transparent front plate disposed in front of the display panel;
    a transparent elastic resin layer formed between the front plate and the active area so as to restrain a stress from being applied from the front plate to the display panel; and
    a frame connected to the transparent front plate and configured to cover the display panel such that a void is formed between the display panel and the frame.

15. The display device according to claim 14, wherein the transparent elastic resin layer has a tensile elasticity of 100 MPa or below at 25° C.

16. The display device according to claim 14, wherein the transparent elastic resin layer is formed by curing a two-component liquid resin material injected between the display panel and the front plate.

17. The display device according to claim 14, wherein the resin layer is disposed at least between the display panel and the front plate.

18. The display device according to claim 14, wherein the frame comprises:
    an injection port through which a resin is inserted to form the resin layer; and
    an evacuation port through which air inside the frame is evacuated.

19. A display device comprising:
    a display panel having an active area to display an image;
    a transparent front plate disposed in front of the display panel;
    a transparent elastic resin layer formed between the front plate and the active area so as to restrain a stress from being applied to the display panel;
    plural fixing members, which are disposed between the display panel and the front plate to fix the display panel to the front panel, wherein the plural fixing members are disposed at intervals to form spacings, which are filled with the transparent elastic resin layer; and
    a frame connected to the transparent front plate and configured to cover the display panel such that a void is formed between the display panel and the frame.

20. The display device according to claim 19, wherein the transparent elastic resin layer comprises a resin material in a gel state.

21. The display device according to claim 19, wherein the resin layer is disposed at least between the display panel and the front plate.

22. The display device according to claim 19, wherein the frame comprises:
    an injection port through which a resin is inserted to form the resin layer; and
    an evacuation port through which air inside the frame is evacuated.

* * * * *